US006463675B1

(12) United States Patent
Hansen et al.

(10) Patent No.: US 6,463,675 B1
(45) Date of Patent: Oct. 15, 2002

(54) PROCESS AND A PLANT FOR SPRAY DRYING

(75) Inventors: Ove Emil Hansen, Allerød; Jens Mourits Sørensen, Virum; Martin Andreas Grønlund Scholten, Rungsted Kyst, all of (DK)

(73) Assignee: Niro A/S, Soborg (DK)

( * ) Notice: Subject to any disclaimer, the term of this patent is extended or adjusted under 35 U.S.C. 154(b) by 0 days.

(21) Appl. No.: 09/485,732

(22) PCT Filed: Sep. 29, 1999

(86) PCT No.: PCT/DK99/00511

§ 371 (c)(1),
(2), (4) Date: Feb. 15, 2000

(87) PCT Pub. No.: WO00/74836

PCT Pub. Date: Dec. 14, 2000

(51) Int. Cl.[7] .................................................... F26B 3/08

(52) U.S. Cl. ............................... 34/373; 34/372; 34/583

(58) Field of Search .......................... 34/363, 366, 367, 34/368, 369, 371, 372, 373, 375, 576, 583, 585

(56) References Cited

U.S. PATENT DOCUMENTS 4,896,436 A * 1/1990 Iwaya et al. ................... 34/60
5,223,088 A * 6/1993 Hansen ........................ 159/2.1
5,248,387 A * 9/1993 Hansen ....................... 159/48.1
5,632,100 A 5/1997 Hansen ......................... 34/374
5,647,142 A * 7/1997 Anderson et al. ............. 34/373

FOREIGN PATENT DOCUMENTS

GB 2113112 A 8/1983
WO WO 97/14288 4/1997

* cited by examiner

*Primary Examiner*—Pamela Wilson
(74) *Attorney, Agent, or Firm*—Sughrue Mion, PLLC

(57) ABSTRACT

In a spray drying process utilizing a spray dryer having internal gas filters and an internal fluidized bed and comprising an after-treatment of the product in a separate unit outside the spray drying chamber, which treatment produces a particle-loaded gas stream, said particle-loaded gas stream is conducted from the separate unit to the spray drying chamber. The stream passes, together with the spent drying gas in the drying chamber, the filters integrated in said chamber. Several plant modifications are suggested for performing the process which involves substantial savings by making external particle collectors superfluous.

21 Claims, 3 Drawing Sheets

PROCESS AND A PLANT FOR SPRAY DRYING

FIELD OF THE INVENTION

The present invention relates to spray drying technology applicable within a broad range of industries, e.g. the pharmaceutical, chemical and food industries.

The term spray drying is here used in a broad sense as meaning not only processes for transforming a solid dissolved or suspended in a liquid into a powdery, possibly agglomerated material, but also processes in which an essential purpose is to agglomerate a particulate material by spraying and drying a liquid thereon.

BACKGROUND OF THE INVENTION

Within the area of spray drying substantial improvements have been developed and implemented within the last many decades. A standard textbook on spray drying technology is Masters, Keath: Spray Drying Handbook, 5th edition, (Longman Scientific & Technical 1991), incorporated herein by reference.

Modifications of the basical spray drying process which are of special relevance in connection with preferred embodiments of the present invention include the application of an internal stationary fluidized bed in the bottom portion of the spray drying chamber as well as the arrangement of a filter in the very spray drying chamber to retain particles in the chamber otherwise removed therefrom entrained in the stream of spent drying gas exhausted from the chamber.

A process and an apparatus utilizing a fluidized bed in the bottom of the spray drying chamber is described i.a. in U.S. Pat. No. 5,632,100 (Hansen). In the embodiments described in said US patent, various types of particle collecting equipment are used for treating not only the spent drying gases withdrawn from the drying chamber but also to treat particle-loaded gas streams resulting from after-treatment of the product particles recovered from the drying chamber in fluidized bed apparatuses or gravitational classifiers.

WO 97/14288 suggests incorporation of special, rigid gas filters into the very spray chamber whereby substantial advantages may be obtained, viz. improved conditions for particle agglomeration in the drying chamber and a reduction of the requirement for particle collecting equipment such as cyclones and filters, including electrostatic filters and fabric filters for treating the spent drying gases from the drying chamber.

Said WO 97/14288 discloses an embodiment in which a product recovered from a first stationary fluidized bed in the bottom of a spray drying chamber having internal, rigid gas filters is subjected to an after-treatment in an annular fluidized bed encircling said first stationary, fluidized bed and having a common ring-shaped partition wall therewith. The gas with entrained fine particles from said annular fluidized bed is introduced into the drying chamber through an annular horizontal slit in short distance above said first fluidized layer, and subsequently passes the gas filters when leaving the chamber together with spent drying gases, whereby said fine particles collect on the filter surfaces.

However, this embodiment has some drawbacks because the presence of said annular slit, which is placed in or just below the walls of the conical bottom portion of the drying chamber, interferes with the first fluidized bed by preventing the desired spouting function thereof. A spouting of material of the first fluidized bed up on the conical walls is essential to keep these free of deposited sticky material. The slit with the upward gas flow therethrough prevents proper return of the spouted material into the first fluidized bed, and involves a risk for relatively moist material dropping down into the annular fluidized bed.

Besides, the use of an annular fluidized bed encircling said first fluidized bed for the after-treatment involved some limitations as to the type of the after-treatment and the operational parameters and the controlling and adjustment possibilities thereof. Therefore it might be preferred to perform the after-treatment in a separate unit optimal for the relevant treatment, in which independently adjustable operational parameters can be applied.

Therefore, it is conventional to use one or more independent, separate apparatuses for the after-treatment.

Whether the after-treatment is a supplementary drying, a cooling, a classification, an agglomeration or a separation, a particle-loaded gas stream is formed, from which the particles must be separated to recover values therein or to avoid environmental pollution.

Therefore, the particle-loaded gas stream withdrawn from the separate after-treatment apparatus is in the prior art processes passed through collection means serving solely-the purpose of separating the particles from said gas stream. Also special measures had to be taken to incorporate the separated particles into the main product stream or for utilizing them in other applications.

These means for collecting the particles from the gas stream from the separate after-treatment apparatus and the means for handling of the collected particles increase the total plant costs and also increase the space requirements.

SUMMARY OF THE INVENTION

Thus it is an object of the present invention to provide a process and a plant, which in comparison with the closely related prior art are simplified by omitting the external collector means for collecting the particles from the gas from the separate after-treatment apparatus.

It has now turned out that it is possible to introduce fine particles entraining gas streams from after-treatment processes, e.g. in fluidized beds, classifiers etc., into the spray drying chamber and thereby utilize the integrated filter in said chamber to clean said gas streams and thus make auxiliary particle collecting means outside the drying chamber redundant. This can be done without disturbing the primary drying gas flow and the drying and agglomeration processes in the drying chamber, and also without decreasing the quality of the resulting product.

Thus, the invention deals with a process for spray drying a liquid to produce an agglomerated product by atomizing the liquid into a drying chamber to form droplets, introducing a first stream of drying gas downward into the upper part of said chamber to partially dry the droplets, introducing a second stream of drying and fluidizing gas upward in the bottom portion of the chamber through a perforated plate to maintain a fluidized layer of particles on said plate, withdrawing a stream of spent drying gas comprising gas from said first and said second stream of gas from the chamber through particle collecting filter means thereby retaining particles on the surface of said filter means, releasing said retained particles from the filter means, to allow their contacting other particles in the chamber for agglomeration and transfer into the fluidized layer, recovering particles from said fluidized layer and by an external pipe means transferring these to an external, separate after-treatment unit and subjecting said particles to at least one after-treatment selected from after-drying, cooling, classification including dust removal, agglomeration, coating and separation, involving gas contact in said unit, and withdrawing a stream of dust-loaded gas from said unit through second external pipe means. According to the invention this process is characterized in that said dust-loaded gas stream is by said second external pipe means conducted into the drying chamber, whereby the gas in this stream passes through the particle-collecting filter inside the chamber before leaving the chamber together with said spent drying gas.

The spray drying process may be of the kind in which the liquid being atomized contains a dissolved or otherwise dispersed solid, which after the drying constitutes the final product.

Alternatively, the process may be characterized in that a particulate solid is injected into the chamber for agglomeration promoting contact with the atomized liquid droplets or moist particles formed by partial drying thereof, and in that solids contained in the liquid show adhesive properties when dried and/or the liquid comprises a solvent evoking stickiness of one or more components of the particulate solid.

To perform the process of the invention certain requirements must be fulfilled by the equipment.

Consequently, the invention also deals with a plant for performing the above specified process, said plant having a drying chamber, an atomizing device in said chamber connected to a source for liquid to be spray dried, a drying gas disperser in the upper portion of the chamber, a perforated plate in the bottom portion of said chamber, a plenum below said plate for providing an upward flow of fluidized and drying gas through the perforations in said plate, sufficient for maintaining a layer of fluidized particles on said plate, a particle-collecting filter inside said chamber, means for withdrawing a stream of gas from said chamber through said filter, outlet means for recovering particles from a fluidized layer existing on said plate during the operation of the plant, and, connected to said outlet means, first external pipe means conducting the recovered particles to at least one external, separate after-treatment unit selected from an after-dryer, a cooler, a classifier, an agglomerator, a coater and a separator, which unit during the operation thereof emits a stream of gas entraining small particles According to the invention in its broadest aspect, this plant is characterized in having second external pipe means for introducing said stream of gas with entrained fine particles emitted from the unit into said drying chamber at a location upstream of said filter.

Typically, said at least one external, separate after-treatment unit is a fluidized bed apparatus for drying and/or cooling the particles provided from the chamber through said first external pipe means. However, it may just as well be a counter-current/gravity classifier.

In preferred versions of the plant, the integrated filter is located in an upper portion of the spray drying chamber.

Most experiences have been obtained with drying chambers having a lower portion of downwardly decreasing horizontal cross-section area, the bottom part of which portion accommodates the perforated plate and the fluidized layer and the filter being located above the slanted wall of said lower portion.

The amount of fine particle-loaded gas produced in the after-treatment may be large, e.g. corresponding to up to 50% of the amount of gas introduced into the drying chamber as drying and fluidizing gas. To avoid that such a large amount of gas disturbs the flow pattern existing in the chamber, which flow pattern is essential for obtaining the desired operation and product qualities, it is preferred that the external second pipe means connecting the after-treatment unit and the drying chamber debouches in an upper portion of the latter on a level with the filter.

In such an embodiment the filter may comprise at least one essentially vertical member of which at least a part is between the atomizer and the location in the upper portion of the chamber for debouching of said pipe means for introducing the gas stream with entrained fine particles.

In a specific embodiment of this last-mentioned version of the plant the filter comprises a plurality of vertical cylinders encircling the atomizer device, the second pipe means for introducing the gas stream with entrained fine particles debouching at least at one location outside the one encircled by the cylinders and at a distance to the nearest of said cylinders not less than 1.5 times the diameter of this cylinder.

By this arrangement it is avoided that the fine particles from the external after-treatment unit contact the hot areas in the drying chamber. This is essential since said fine particles are due to their lower moisture content more at risk of being heat-damaged than the average particles present in the drying chamber.

This last-mentioned embodiment furthermore has the advantage that the risk for damage of the filters due to abrasion is minimized, by avoiding impingement by very fast particles on the filter surface. Furthermore, a uniform building-up of particles on the filter surface is obtained.

The versions of the plant described above have a stationary fluidized layer at the bottom of the drying chamber. However, it might be possible to achieve some of the advantages inherent in the invention by using a more conventional spray drying chamber without fluidized layer in the bottom, especially if a sufficient agglomeration of the fine particles introduced from the external after-treatment unit is ensured.

The invention and subject-matter of claims not dealt with above is explained below with reference to the drawings.

DETAILED DESCRIPTION OF THE INVENTION AND PREFERRED EMBODIMENTS

Figure 1:
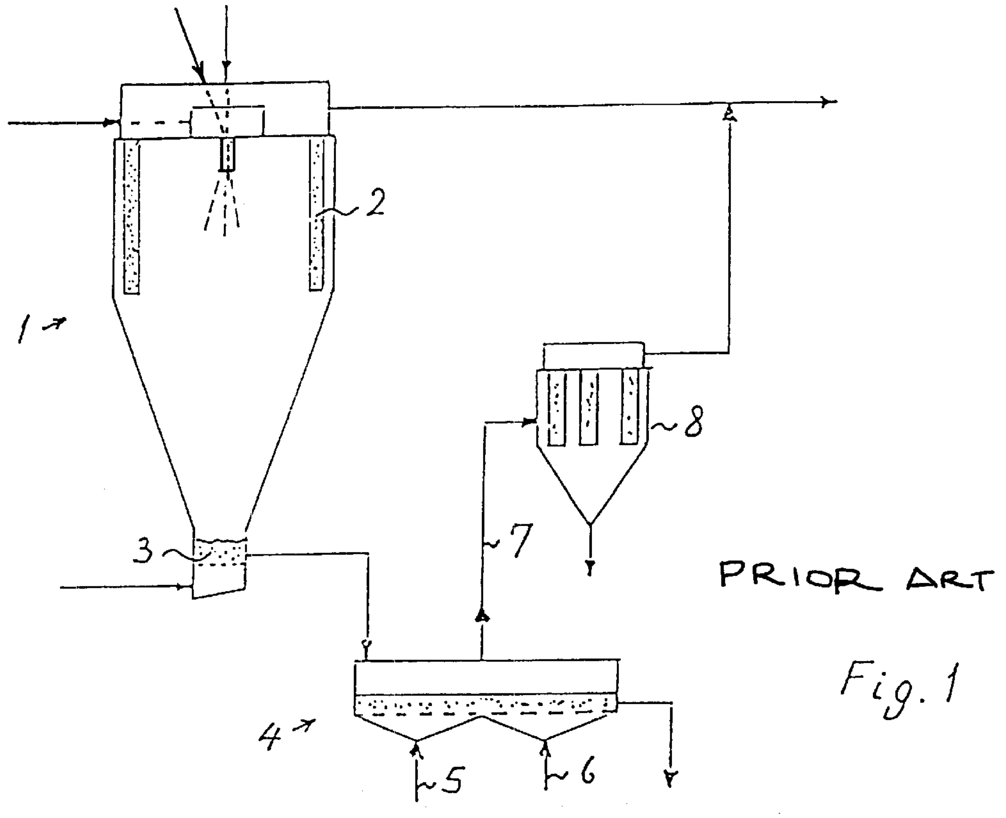
FIG. 1 shows a schematical layout for a typical process and equipment representing the closest prior art.

FIG. 1 represents a spray dryer having an internal filter 2, possibly consisting of several elements, and a fluidized powder-layer 3 at the bottom portion.

Spray drying apparatuses of this type are disclosed i.a. in the above WO 97/14288. The integrated filters in this type of dryers serve the primary purpose of separating particles from the spent drying gas, but at the same time agglomeration on the filters occurs on the filter surface and further agglomeration occurs in other zones of the drying chamber as described in said WO 97/14288. This reference describes substantially rigid filters. However, the integrated filters may be made of a filter wall material that can be a rather soft material, such as non-woven or woven fabric of polymers, supported by a basket in the interior of the bag, or can be made from a self-supporting substantially rigid porous material, such as sintered metal or woven metal fibres or sintered ceramics.

The functioning of the prior art spray dryer shown in FIG. 1 will be evident after reading of the below explanation of a related apparatus in connection with FIG. 2. In the prior art embodiment depicted in FIG. 1, the elements forming the filter 2 are placed quite near the walls of the spray dryer, because it was regarded as essential to have the distance from the filter elements to the central atomizer as large as possible.

From the fluidized layer 3 a stream of particulate product is recovered and lead to an external fluidized bed apparatus 4. In the shown embodiment this apparatus has two treatment zones.

The fluidized particles in this apparatus first pass a drying zone receiving relatively warm drying gas through a conduit 5, and thereafter pass through a second zone receiving fluidizing and cooling gas through conduit 6.

However, the fluidized bed apparatus 4 is just illustrated as an example of apparatuses conventional for after-treatment of spray dried powders. As mentioned above, several other after-treatment apparatuses and processes come into consideration in connection with the present invention as long as said after-treatments produce a stream of gas entraining fine particles blown off from the product being treated.

In FIG. 1 the gas introduced through the conduits 5 and 6 leaves the apparatus 4 through a conduit 7 entraining particles blown-off from the fluidized layer in the apparatus 4.

Through conduits 7 this gas reaches a particle collector device 8 shown as a bag filter. However, this device can just as well be an electrostatic filter or a cyclone, or a combination of the types of collector devices mentioned.

The gas from which the particles has been removed in 8 is disposed of together with the spent drying gas having passed the internal filter 2. The particles collected in the collector device 8 may be admixed with the product withdrawn from the fluidized bed apparatus 4 if presence of fine particles therein is acceptable, otherwise they may be disposed of, added to the liquid to be spray dried or used for other purposes.

By the present process it is possible to completely omit the collector device 8 and at the same time to have the particulate product hitherto recovered from 8 incorporated as part of product agglomerates. Therefore, said particles may be utilized, as part of the final product without deterioration of the quality thereof. That means for instance without increase of the dust content thereof.

Figure 2:
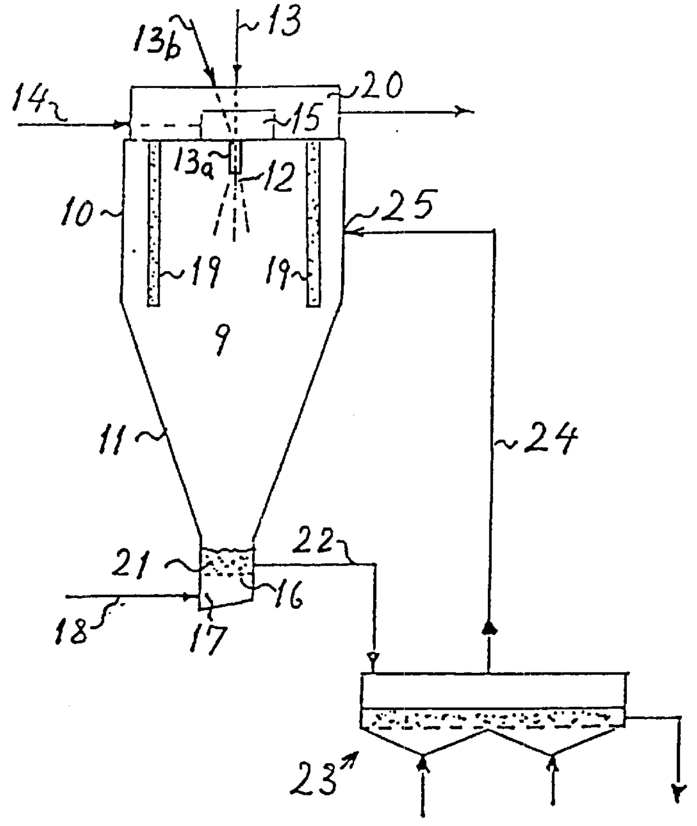
FIG. 2 shows schematically a layout for an embodiment of the plant according to the invention.

The improvement of the prior art technique imparted by the invention can be exemplified by the embodiment depicted in FIG. 2.

In FIG. 2, 9 represents a drying chamber having an upper portion 10 and a bottom portion 11. Centrally in said upper portion is an atomizing device 12 which may comprise one or more pressure nozzles or 2-fluid nozzles or a rotary atomizer.

The atomizer is through a conduit 13 connected to a source for the liquid to be spray dried.

13*a* is a pipe or similar means for introducing a particulate material around the atomizing device 12. 13*a* is through a conduit 13*b* connected to a source for this particulate material.

A duct 14 provides drying gas to a drying gas disperser 15 in the upper portion of the chamber.

In the bottom portion of the chamber is a perforated plate 16 and below this plate is a plenum 17 supplied with a stream of drying and fluidizing gas through conduit 18.

In the upper portion of the drying chamber 9 is a particle-collecting filter 19, which may comprise several members, and above the filter members is means 20 through which a stream of gas is withdrawn from the chamber 9 through the filter 19.

When operating the plant, the liquid to be spray dried is via conduit 13 lead to the atomizer 12, and, if desired, particulate material is introduced through 13*b* and 13*a*.

A downward stream of drying gas is provided through 14 and 15 to contact liquid droplets atomized by 12.

Through the conduit 18, a drying and fluidization gas is introduced into the plenum 17 to create an upward gas flow through the perforations of the plate 16.

The gas flows from the disperser 15 and from the perforated plate 16 interact to form a flow pattern in the drying chamber which is described in detail in the above-mentioned WO 97/14288 and U.S. Pat. No. 5,632,100. In these citations also the importance of said flow pattern to obtain a desired agglomeration of the particles formed by the drying of the droplets atomized by the device 12 is described.

On the plate 16, a fluidized layer 21 is built-up, constituted of agglomerated moist particles formed by drying of the atomized droplets with possible interaction of the particles introduced through 13*a*.

A stream of gas consisting of drying gas introduced through 14 and 15 and drying gas introduced through 18 and 17 as well as of any auxiliary gas streams introduced into the drying chamber is withdrawn through the filter 19 and the withdrawing means 20 connecting thereto.

When the flow of particle-loaded gas reaches the filter 19, the particles settle on the surface thereof. The thus formed particle layer is loosened spontaneously or preferably by counter-blowing or vibration and falls downwards in the drying chamber to reach agglomeration promoting zones, in the depicted version near the walls of the bottom section 11 of the chamber, before reaching the fluidized layer 21.

From the fluidized layer 21, a stream of particles is recovered and by first external pipe means 22 lead to an external, separate after-treatment unit 23, which may be of the same type as described for the apparatus 4 in FIG. 1.

A particle-loaded stream of spent treatment gas leaves 23 through second external pipe means 24. It is an essential feature of the invention that this stream of particle-loaded gas by the pipe means is conducted to introduction means 25 for introducing said stream of gas into the drying chamber 9 at a location upstream of the filter 19. This means that the gas introduced through 24 and 25 must pass the filter 19 to leave the drying chamber 9.

The means 25 for introducing the gas stream into the drying chamber is one or more openings, preferably slits in the walls of the chamber.

In the specific embodiment shown in FIG. 2, where the chamber 9 has a lower portion 11 having a downwardly decreasing horizontal cross-section area, the bottom of which portion accommodates the perforated plate 16 and the fluidized layer 21, and the filter 19 is located in the upper portion of the chamber above the slanted wall of the lower portion. The means 25 for introducing the stream of gas with entrained fine particles in the depicted embodiment debouch in the upper portion of the chamber on a level with said collecting filter 19.

FIG. 2 also illustrates a feature which is important in certain embodiments of the invention, viz. that the filter 19 comprises at least one essentially vertical member of which at least a part is arranged between the atomizer and the location in the upper portion 10 of the chamber for the debouching of said means 25 for introducing the gas stream with entrained fine particles from the after-treatment unit 23. Thereby the filter has a shielding effect protecting the flow in the central zone of the drying chamber against the influence of the gas stream introduced through 25. As explained above, this embodiment is especially advantageous when the stream of particle-loaded gas from the after-treatment unit is large.

Figure 3:
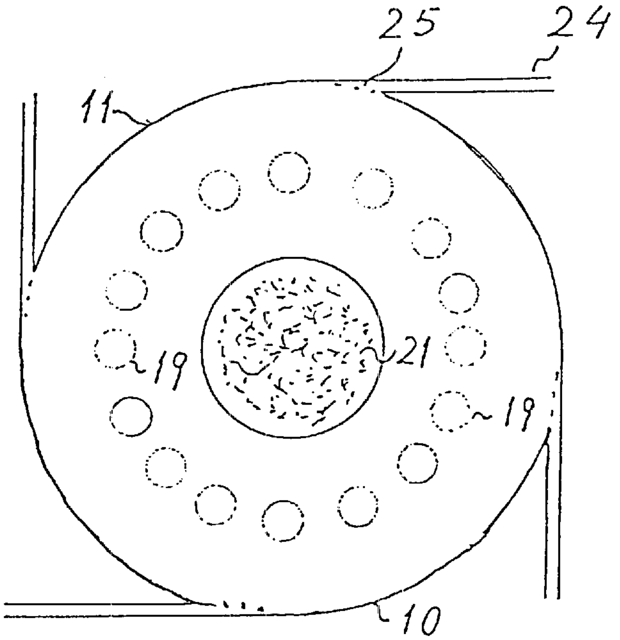
FIG. 3 is a schematical horizontal section of a spray drying chamber forming part of the plant shown in FIG. 2.

FIG. 3 is a schematical horizontal sectional view through the upper part of a drying chamber similar to the one depicted in FIG. 2. The section is at level with the means 25 and made in a somewhat larger scale than FIG. 2.

In the embodiment of FIGS. 2 and 3, the filter 19 comprises a plurality of vertical cylinders encircling the atomizer device 12. The means 25 for introducing the gas stream with entrained fine particles debouches at a location outside the one encircled by the cylinders and at a distance to the nearest of the cylinders preferably not less than 1.5 times the diameter of this cylinder. To fulfill this requirement the filter 19 in FIG. 2 is placed more distant from the chamber walls, and thus nearer the atomizer than the filter 2 in FIG. 1. It might have been expected that problems would occur due to contact between filter and moist particles or droplets. However, it has turned out that such a modification can be made without detrimental effect. Nevertheless, it is within the scope of the invention to arrange for the use of a shielding plate between the atomizer and the filter in case the reduced distance between them cause problems.

In FIG. 3 four introducing means 25 are shown.

By such an arrangement it is avoided that the introduced gas disturbs the desired gas flow in the central part of the drying chamber and at the same time excessive abrasion and other disturbance of the filters by the particles entrained in the gas is avoided.

As seen in FIG. 3, it is in one embodiment of the invention preferred that the upper portion of the drying chamber comprises a wall rotationally symmetrical in relation to a vertical axis, and that the means 25 for introducing the gas stream with entrained particles is directed to inject said stream into the chamber in a direction essentially tangential to said wall. Said direction may be horizontal or tilted upwards or downwards.

Such an embodiment enables introduction of the gas stream from the after-treatment unit 23 in such a way that a minimum mixing with the usually hotter gases in the drying chamber takes place before the gases are withdrawn through the filters. Thereby a substantial lowering of the temperature of the drying gases in the central parts of the drying chamber is avoided.

The tangential introduction also enables a more even distribution of the introduced air with entrained particles on the total filter surface.

To avoid abrasion of the filters, it is furthermore possible to insert a shielding plate protecting the filter surfaces against direct impingement of entrained particles introduced by the gas stream (this feature is not shown in the drawing).

Figure 4:
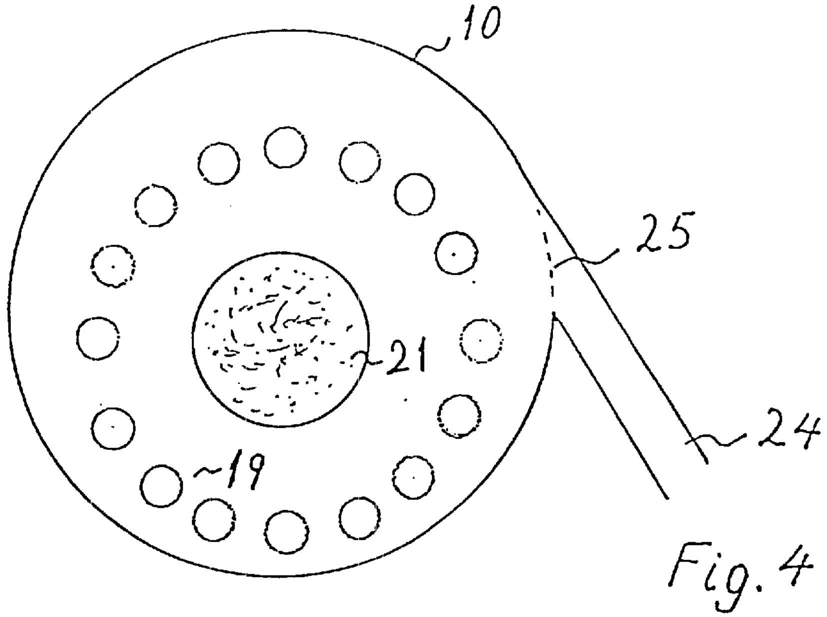
FIG. 4 is a schematical horizontal section through another embodiment of the spray chamber of the plant according to the invention.

FIG. 4 shows an embodiment in which the atomizer device and the vertical filter cylinders 19 co-axially encircling said device is dislocated in relation to the imaginary vertical axis of the rotation symmetrical wall of the upper chamber portion 10, and the means 25 for introducing the gas stream with entrained particles debouches at a place and in a direction to inject said gas stream towards an area where the distance between said wall and the filter cylinders is maximal.

Figure 5:
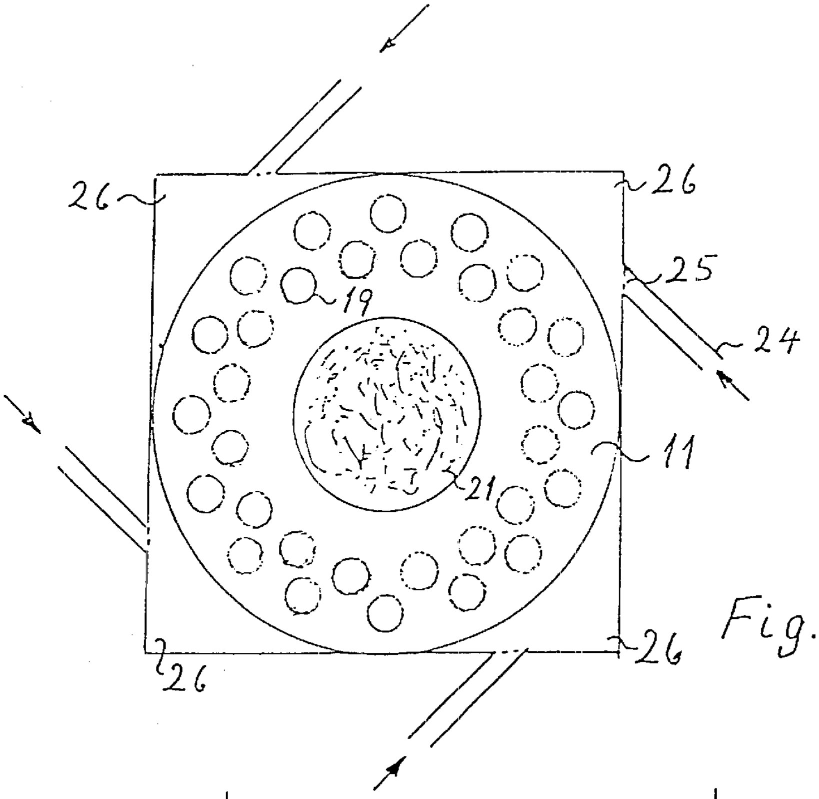
FIG. 5 is a schematical cross-section through a further embodiment of a spray drying chamber forming part of the plant according to the invention.

In a still further embodiment the shape of the upper portion of the drying chamber is such that a horizontal section thereof forms a polygon, as shown in FIG. 5, the corners 26 of which are more distant from the filter cylinders 19 than are the remaining part of the section. In this embodiment the means 25 for introducing the gas stream with entrained particles debouches near said corners 26. This embodiment ensures a uniform introduction of the particle-loaded gas distant from the filter to obtain minimum disturbance of the drying operation and economy and minimum filter damage.

Figure 6:
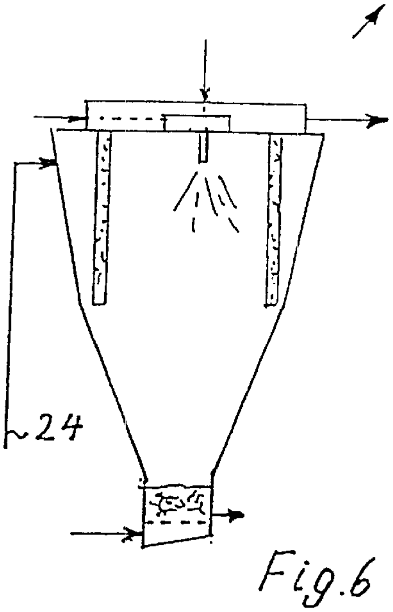
FIG. 6 is a vertical partial sectional view of a further embodiment of a spray drying chamber forming part of the plant according to the invention.
Figure 7:
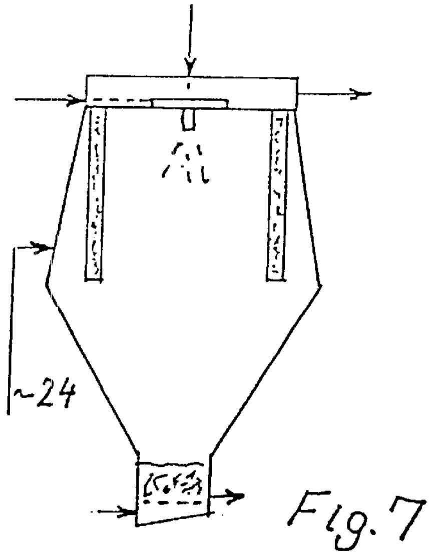
FIG. 7 is a vertical, partial sectional view of a still further embodiment of a spray drying chamber according to the invention.

FIGS. 6 and 7 illustrate other modifications of drying chamber design to obtain an increased distance from the gas introducing means 25 and the filters. The upper portion of the drying chamber has an upward or downward tapering frusto-conical shape whereas the filter cylinders are vertical, and the means 25 for introducing the gas stream with entrained particles debouches near a location where the distance between the wall of the upper portion of the drying chamber and the filter cylinders is maximum.

In preferred embodiments of the invention the means 25 for introducing the stream of gas with entrained particles into the drying chamber is a slit.

In embodiments of the drying chamber where the filter comprises vertical cylinders as those depicted in FIGS. 2–7 the slit or slits forming the means 25 is preferably vertical, and the distance from the slit to the nearest filter cylinder is not less than the width of the slit.

It should be observed that although all the Figures show a filter consisting of several vertical cylinders it is within the scope of the invention to utilize any filter construction, e.g. as disclosed in the previously cited WO 97/14288.

The various embodiments depicted in the drawings should only be regarded as non-limiting examples of designs suitable for performing the present invention. To the person skilled in the art it is obvious that several modifications are possible within the scope of the invention.

What is claimed is:

1. A process for spray drying a liquid to produce an agglomerated product by atomizing the liquid into a drying chamber to form droplets, the process comprising the following steps:

introducing a first stream of drying gas downward into the upper part of said chamber to partially dry the droplets;

introducing a second stream of drying and fluidizing gas upward in the bottom portion of the chamber through a perforated plate to maintain a fluidized layer of particles on said plate;

withdrawing a stream of spent drying gas comprising gas from said first and said second stream of gas from the chamber through particle collecting filter means thereby retaining particles on the surface of said filter means releasing said retained particles from the filter means, to allow their contacting other particles in the chamber for agglomeration and transfer into the fluidized layer recovering particles from said fluidized layer and by an external pipe means transferring these to an external, separate after-treatment unit and subjecting said particles to at least one after-treatment selected from after-drying, cooling, classification including dust removal, agglomeration, coating and separation, involving gas contact in said unit and withdrawing a stream of dust-loaded gas from said unit through second external pipe means, wherein said dust-loaded gas stream is withdrawn by said second external pipe means conducted into the drying chamber, whereby the gas in this stream passes through the particle collecting filter inside the chamber before leaving the chamber together with said spent drying gas.

2. The process of claim 1, wherein the liquid being atomized contains a dispersed solid.

3. The process of claim 2, wherein the dispersed solid is dissolved.

4. The process of claim 1, wherein a particulate solid is injected into the chamber for agglomeration promoting contact with the atomized liquid droplets or moist particles formed by partial drying thereof, and in that solids contained in the liquid show adhesive properties when dried.

5. A plant for performing the process of claim 1, comprising:

a drying chamber;

an atomizing device in said chamber connected to a source for liquid to be spray dried;

a drying gas disperser in the upper portion of the chamber;

a perforated plate in the bottom portion of said chamber;

a plenum below said plate for providing an upward flow of fluidized and drying gas through the perforations in said plate, sufficient for maintaining a layer of fluidized particles on said plate;

a particle-collecting filter inside said chamber;

means for withdrawing a stream of gas from said chamber through said filter;

outlet means for recovering particles from a fluidized layer existing on said plate during the operation of the plant;

first external pipe means, connected to said outlet means, conducting the recovered particles to at least one external, separate after-treatment unit selected from an after-dryer, a cooler, a classifier, an agglomerator, a coater and a separator, which unit during the operation thereof emits a stream of gas entraining small particles; and second external pipe means and introduction means for introducing said stream of gas with entrained fine particles emitted from the unit into said drying chamber at a location upstream of said filter.

6. The plant of claim 5, further comprising means for injecting a particulate solid into the drying chamber adjacent to the atomizer device.

7. The plant of claim 5, wherein said at least one external separate unit is a fluidized bed apparatus for at least one of drying and cooling the particles provided through said first external pipe means.

8. The plant of claim 5, wherein said filter is located in an upper portion of the chamber.

9. The plant of claim 8, wherein the chamber has a lower portion having a downwardly decreasing horizontal cross-section area, the bottom part of which portion accommodates the perforated plate and the fluidized layer, the filter being located above the slanted wall of said lower portion.

10. The plant of claim 8, wherein the second external pipe means connecting said unit and the drying chamber debouches in an upper portion of the latter on a level with said filter.

11. The plant of claim 8, wherein the filter comprises at least one vertical member of which at least a part is between the atomizer and the location in the upper portion of the chamber for debouching of said introduction means and the second pipe means.

12. The plant claim 5, wherein the filter comprises a plurality of vertical cylinders encircling the atomizer device, the second pipe means and the introduction means for introducing the gas stream with entrained fine particles debouching at least at one location outside the one encircled by the cylinders.

13. The plant of claim 12, wherein the distance from the location for the debouching of the introduction means to the nearest of said cylinders is no less than 1.5 times the diameter of this cylinder.

14. The plant of any one of claim 12, wherein the shape of the upper portion of the drying chamber is such that a horizontal section thereof forms a polygon, the corners of which are more distant from the filter cylinders than is the remaining part of the section, and the means for introducing the gas stream with entrained particles debouching near said corners.

15. The plant of claim 12, wherein the filter comprises vertical cylinders, and the means for introducing the stream of gas with entrained fine particles from the second pipe means into the drying chamber is a vertical slit, and the distance therefrom to the nearest filter cylinder is not less than the width of the slit.

16. The plant of claim 5, wherein said upper portion of the drying chamber comprises a wall rotationally symmetrical in relation to a vertical axis, and the means for introducing the gas stream with entrained particles is directed to inject aid stream into the chamber in a direction tangential to the wall.

17. The plant of claim 16, wherein the atomizer device and the vertical filter cylinders coaxially encircling said device is disclosed in relation to the imaginary vertical axis of the rotationally symmetrical wall of the upper chamber portion, and the means for introducing the gas stream with entrained particles debouching at a place and in a direction for injecting the gas towards an area where the distance between said wall and the filter cylinders is maximal.

18. The plant of claim 16, wherein the upper portion of the drying chamber has a tapering frusto-conical shape whereas the filter cylinders are vertical, and the mans for introducing the gas stream with entrained particles debouching near a location where the distance between said wall of the upper portion of the chamber and the filter cylinders is maximum.

19. The plant of claim 5, further comprising at least one shielding plate, protecting the filter against direct impingement of the entrained particles introduced by the gas stream from the external second pipe means through means.

20. The plant of claim 5, wherein the means for introducing the stream of gas with entrained fine particles from the second pipe means into the drying chamber is in a slit.

21. The process of claim 1, wherein a particulate solid is injected into the chamber for agglomeration promoting contact with the atomized liquid droplets or moist particles formed by partial drying thereof, and in that the liquid comprises a solvent evoking stickiness of at least one component of the solid.

* * * * *